Feb. 1, 1944.    N. COOKE ET AL    2,340,508
MANUFACTURE OF CONNECTORS HAVING FORKED ENDS
Filed March 10, 1942    2 Sheets-Sheet 1
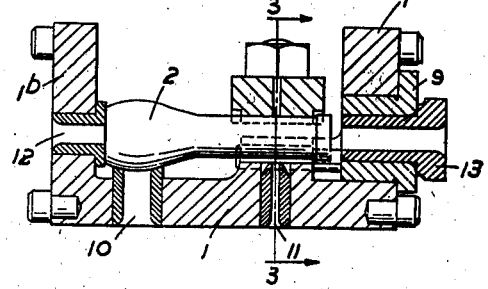
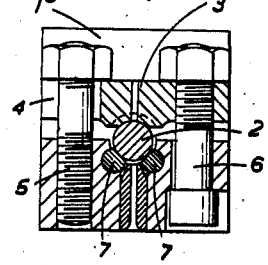
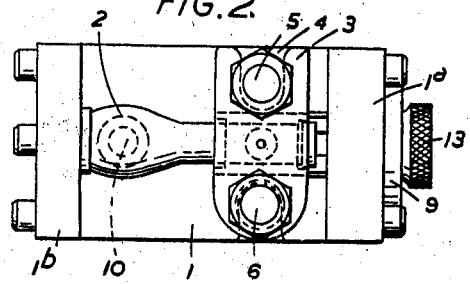
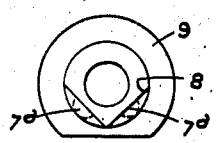
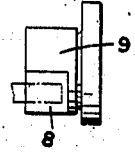
INVENTORS
N. COOKE
BY R. I. MINCHOM
ATTORNEYS

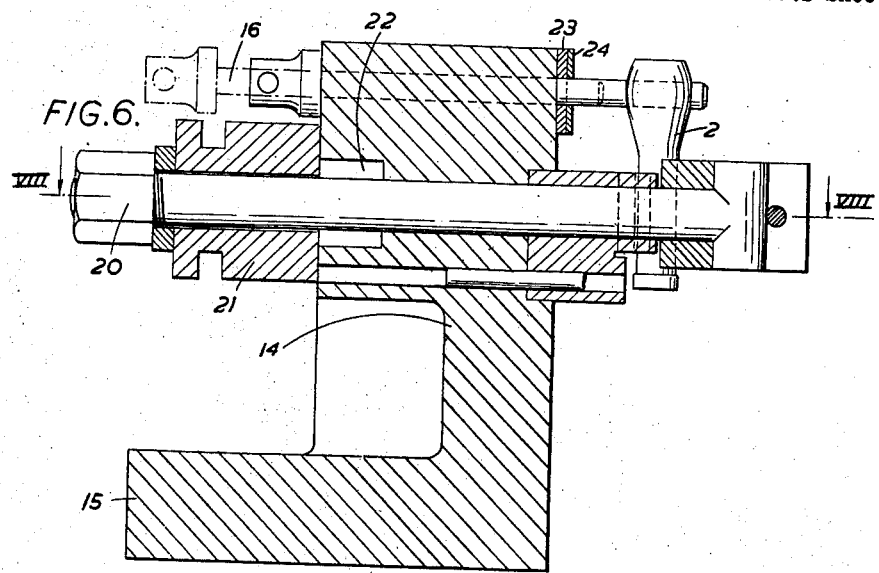
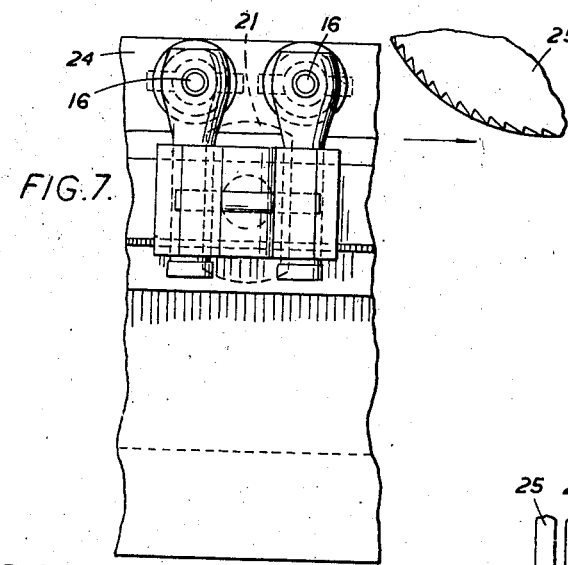
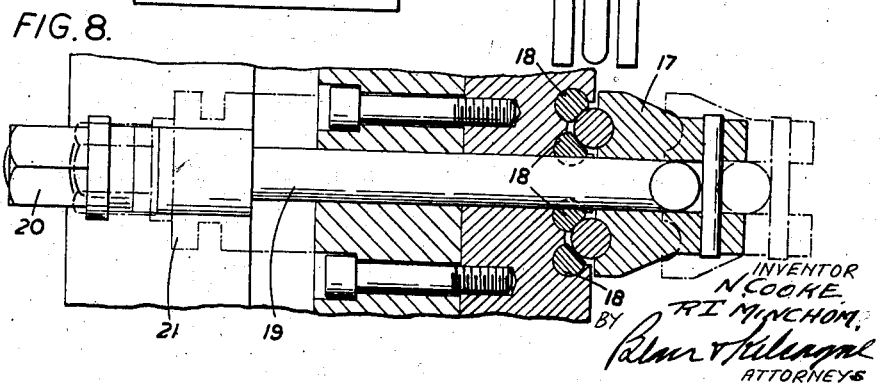

Patented Feb. 1, 1944

2,340,508

UNITED STATES PATENT OFFICE 2,340,508

MANUFACTURE OF CONNECTORS HAVING FORKED ENDS

Norman Cooke and Raphael Isaac Minchom, Sunderland, England

Application March 10, 1942, Serial No. 434,150
In Great Britain February 24, 1941

6 Claims. (Cl. 77—62)

This invention relates to the manufacture of connectors for the ends of rods, wires or the like and comprising a tubular or barrel portion which is internally screwthreaded to engage the rod or wire and an enlarged head which is slotted to form a fork and provided with a transverse hole to receive a bearing pin.

When such connectors are used for straining wires, for example bracing wires in aircraft structures, the material from which they are made has a very high tensile strength and it is usual to provide an inspection hole in the shank or barrel at the inner end of the screwthreaded portion and for an axially extending clearance hole to be provided in the jaws of the fork.

Hitherto a blank has been formed either by a cold heading process or in a lathe where the ends are drilled as a separate operation. The head has then been milled to form a fork after which the forked end is provided with a hole to receive the cross pin, the inspection hole is formed and the tubular shank is tapped, as a rule as many as four taps being required to prevent breakage of the taps owing to the tough nature of the material and the difficulties which result from using floating vices for the tapping operations.

According to the present invention the method of forming a component with a forked end consists in drilling a transverse hole through the head of the component in one jig and then using this hole to locate the component in a second jig, in which the head is milled to produce a slot of the required depth and with its flat walls at right angles to the longitudinal axis of the hole. Preferably all the drilling and tapping operations are carried out in the first jig whilst the second jig serves to hold the components while the end is milled to form a fork. Thus in the first jig the shank is drilled and tapped and the enlarged head is drilled to receive the cross pin so that it is possible to locate the drilled blank with great accuracy in the second jig as this includes locating pins which are withdrawn after the components have been clamped in position prior to the milling operation. Further, by the use of the improved jigs and by carrying out successive operations in accordance with the present invention, any rags can be readily removed by means of a simple pressing tool so that practically no hand filling is necessary.

The jig according to this invention in which the first series of operations is performed comprises a supporting block in which the component is clamped so that its length is parallel to that of the supporting base, a drilling bushing at the end of the support adjacent to the head of the component and in axial alignment with the component, an opening at the opposite end of the support coaxial with the component adapted to receive interchangeable drilling and tapping bushings for the shank of the component and drill bushings in the base of the supporting block for forming transverse openings in the head and shank of the component.

The jig is correctly located for drilling the axial holes and for tapping the shank by means of pins on the opposite ends of the jig. Hence the component remains in this first jig whilst all the holes are being drilled and whilst the shank is being tapped and end-faced, there being no possibility of the taps being wrongly aligned. The opening adjacent to the end of the shank is sufficiently large in diameter to receive the facing cutter without having to use a separate guide bush for the end-facing operation.

The second jig in which the subsequent milling operations are performed comprises a support having in its face a number of recesses each adapted to receive the shank of a component, means for clamping these shanks against the face of the support and a number of movable locating pins each adapted to engage the transverse hole in the head of a component while it is being clamped in position, these pins being thereafter withdrawn prior to the components being successively presented to the milling cutter by which a central slot is provided in the head of each component. Preferably three parallel cutters are employed so that flats are formed on the sides of the head simultaneously with the central slot. Each jig may support as many as ten or more components and the clamps are so arranged that as the components are milled they can be removed and the jig re-loaded whilst the machine is still operating on the remainder. The exposed ends of the locating pins pass through a protective strip or washer of leather or fibre to prevent cuttings from entering the guide holes in the support. At the end of its travel the table may be lowered and returned to the operating position so that the cutters can start operating upon the new blanks which have replaced those which were first milled. It will thus be seen that there is practically no time wasted in loading the jig and that all the successive operations are rapidly carried out with the necessary precision.

In carrying out the drilling operations the jig may be successively taken to a number of drill spindles or these spindles may be combined in a multi-spindle drilling machine or located round an indexing table. Some of the spindles may be arranged to operate simultaneously upon each end of the component.

The jigs for carrying out the first and second series of operations according to the present invention are illustrated in the accompanying drawings, in which Figure 1 shows the drilling jig in sectional side elevation, Figure 2 shows the jig in plan, Figure 3 is a cross-section on the line III—III of Figure 1, Figure 4 is an end elevation of one of the drilling bushes, Figure 5 is a side elevation thereof, Figure 6 is a sectional side elevation of the milling jig, Figure 7 is an end elevation showing a part of the jig with two components in position, Figure 8 is a section on the line VIII—VIII of Figure 6, and Figure 9 shows in perspective the completed component.

The drilling jig shown in Figures 1 to 3 comprises a substantially U-shaped member, the base 1 of which is provided with a recess to receive the cylindrical shank of the component 2. This shank is clamped in the recess by means of a transverse clamping member 3 which has an open-ended slot 4 and is held in place by means of a stud 5 and bolt 6. The head of the bolt 6 is housed in an open-ended slot formed in the base 1 so that if the nut of the stud 5 is slackened, the clamp can easily be withdrawn.

The recess in the base which receives the shank of the component 2 is provided with hardened steel pins 7 furnished with flats arranged at an angle of 45° to the central vertical plane of the component so that, in effect, they constitute a V-shaped notch. The ends 7a of the pins are also provided with flats and these extend into an opening formed in the end wall 1a of the jig and are engaged by flats 8 formed on a bush 9 which is pressed into the end wall 1a. Thus the pins 7 are correctly located so that the flat surfaces on them form a V-shaped notch in which the shank of the component 2 is clamped.

In the base of the jig a drilling bush 10 is provided through which the transverse hole is drilled in the head of the component and a second smaller bush 11 is furnished in the base for the inspection hole in the shank of the component. The end wall 1b, against which the head of the component bears, carries a drilling bush 12 in axial alignment with the component and the fixed bush 9 is provided with a removable drilling bush 13 through which the shank of the component is drilled.

When the component has been clamped in the jig it is first drilled, that is to say the two transverse holes are formed with the aid of the drilling bushes 10 and 11 in the base, the head is drilled in an axial direction through the drilling bush 12 and the shank is also drilled through the bush 13. The bush 13 is then withdrawn and a spot-facing tool is introduced through the bush 9 so as to face the end of the shank. Finally the shank is tapped through the bore of the bush 9. The sequence in which these operations are performed can of course be varied and two or more drilling operations can be simultaneously performed. Suitable dowel or guide pins are provided for drilling axial holes and tapping the shank, thus ensuring accurate alignment of the work.

The component is then removed from the drilling jig and clamped in position in the milling jig shown in Figures 6 to 8. This jig is adapted to support a number of similar components which have all been drilled and tapped in the jig above described.

The milling jig comprises a supporting member or body 14 having a base portion 15 and a series of horizontally mounted sliding guide pins 16 which serve to locate the component 2 by engaging the transverse hole drilled through the head of the component. This ensures the slot being absolutely square and of the exact depth with relation to the transverse hole. The shank of the component is clamped in position against the face of the body portion 14 by means of a movable clamping member 17 furnished with two recesses of semi-circular cross-section each adapted to engage the shank of a component and hold it in position against hardened steel pins 18 housed in recesses on the face of the body 14. These pins 18 are similar to the pins 7 already described and form an easily replaceable substitute for V-shaped notches. The movable clamp members 17 are carried by bolts 19 and, in addition to being provided with a clamping nut 20, each bolt has a slip washer 21 of substantially rectangular shape which is adapted to enter a groove or recess 22 in the body when the washer is turned about the bolt through 90° so that its greatest length is parallel to the length of the groove. Thus to release a pair of components it is only necessary to slacken the nut 20 a half-turn, to rotate the slip washer 21 through 90° so that it will enter the groove 22 whereupon the entire clamp 17 together with its bolt can be moved into its disengaged position shown by dotted lines in Figure 8.

The face of the body 14 through which the free ends of the sliding pins 16 pass is provided with a layer of leather 23 or a series of washers of other suitable resilient material retained in place by means of a brass strip 24 so that when the pins are withdrawn after the components have been properly located and clamped in position, any cuttings on the pins are prevented from entering the guide holes in which the locating pins are housed.

The milling cutters 25, 26 by which the flats 2a on each side of the head of the component and the fork or central slot 2b are respectively formed, work at right angles to the length of the locating pins 16 and as many as ten or more pairs of components may be mounted in one jig so that as the components are milled, they can be removed and the jig can be re-loaded whilst the machine is still operating on the remainder. At the end of its travel the table supporting the base 15 of the jig may be lowered and returned to the operating position so that the cutters can start operating the new blanks or drilled components which have replaced those which were first milled.

It will be understood that the drawings illustrate the invention in a somewhat diagrammatic manner and that constructional details can be varied without departing from the invention. Not only is the number of loading operations reduced but accurate work is ensured and damage to the taps which occurs when the work is improperly aligned or insecurely held with methods at present in use, is prevented.

What we claim as our invention and desire to secure by Letters Patent is:

1. A jig for use in the manufacture of internally screw-threaded components having a forked head which comprises a supporting block, means for clamping the component in said block so that its length is parallel to that of the supporting base, parallel spaced pins with cooperating flats for locating said clamped component, a drilling bush at one end of the support adjacent to the head of the component and in axial alignment therewith, the opposite end of the support having an opening coaxial with the component, an interchangeable bush mounted in said opening adjacent said spaced pins to enable the shank of the component to be tapped, and a drilling bush in the base of the support for forming a transverse opening in the head of the component.

2. A jig for use in the manufacture of internally screw-threaded components as claimed in claim 1, in which the supporting block includes a V-shaped notch into which the shank of the component is clamped, said V-shaped notch comprising said spaced pins locked in place by one of said drill bushes.

3. A jig for use in the manufacture of forked ended components after a transverse hole has been drilled through the head comprising a support provided with a number of V-shaped recesses in its face, means for clamping the shanks of the components in said recesses, a plurality of movable pins each adapted to engage the transverse hole in the head of a component and thus correctly locate the latter whilst it is being clamped into position, said pins adapted to be thereafter withdrawn so that the components can successively be presented to a milling cutter by which a central slot is formed in the head of each component at right angles to the length of the transverse hole.

4. A jig for use in the manufacture of forked-ended components as claimed in claim 3, in which the clamping means includes a clamping bolt having a slip washer to facilitate the re-loading of the jig whilst the milling operation is still in progress.

5. A jig for use in the manufacture of forked-ended components as claimed in claim 3, in which a strip of resilient material is mounted on the face of the support through which pass the free ends of the locating pins so as to prevent cuttings which may fall on the exposed ends of the pins from entering the guide holes in which the said pins are housed.

6. A jig for use in the manufacture of forked-ended components as claimed in claim 3, in which the V-shaped recesses in the face of the jig are each furnished with renewable pins having flats to engage the shank of the connectors when clamped therein.

NORMAN COOKE.
RAPHAEL ISAAC MINCHOM.